US012683730B2

(12) United States Patent
Chen et al.

(10) Patent No.: US 12,683,730 B2
(45) Date of Patent: Jul. 14, 2026

(54) COOPERATIVE TRANSMISSION METHOD BASED ON ADAPTIVE TERMINAL AGGREGATION

(71) Applicant: Beijing University Of Technology, Beijing (CN)

(72) Inventors: Huamin Chen, Beijing (CN); Ruijie Fang, Beijing (CN); Xinqi Zhao, Beijing (CN); Shaofu Lin, Beijing (CN)

(*) Notice: Subject to any disclaimer, the term of this patent is extended or adjusted under 35 U.S.C. 154(b) by 306 days.

(21) Appl. No.: 18/539,322

(22) Filed: Dec. 14, 2023

(65) Prior Publication Data
US 2025/0038904 A1    Jan. 30, 2025

(30) Foreign Application Priority Data
Jul. 28, 2023    (CN) .......................... 202310944946.2

(51) Int. Cl.
H04L 5/00           (2006.01)
(52) U.S. Cl.
CPC .................................. H04L 5/0035 (2013.01)
(58) Field of Classification Search
CPC ..................................................... H94L 5/0035
See application file for complete search history.

(56) References Cited

U.S. PATENT DOCUMENTS

| 2009/0175214 A1* | 7/2009 | Sfar ..................... H04J 11/0053 |
| | | 370/315 |
| 2011/0170450 A1* | 7/2011 | Juntti .................... H04L 1/1867 |
| | | 370/252 |
| 2013/0039326 A1* | 2/2013 | Kim ..................... H04B 7/0632 |
| | | 370/329 |
| 2014/0098777 A1* | 4/2014 | Lim ...................... H04W 72/21 |
| | | 370/329 |
| 2014/0293874 A1* | 10/2014 | Oh ........................ H04B 7/0689 |
| | | 370/328 |

* cited by examiner

*Primary Examiner* — Brenda H Pham

(57)           ABSTRACT
A cooperative transmission method based on adaptive terminal aggregation includes arranging a base station, several mobile terminals and several cooperative nodes, and further includes the following steps: S1, judging an aggregation form by a judgment node according to the quality of the first link and the quality of the second link; S2, based on a control signaling received from the base station, transmitting business data to the base station by a mobile terminal at the first-time point and within a specific resource; and S3, if the aggregation form is the cooperative node transmission, monitoring the business data transmitted via the mobile terminal at the first-time point in S2 by one or several cooperative nodes and decoding the business data. By dynamically adjusting the values of the first regulatory factor and the second regulatory factor, the adaptive terminal aggregation form with the lower energy-delay product for each user is selected.

12 Claims, 4 Drawing Sheets

COOPERATIVE TRANSMISSION METHOD BASED ON ADAPTIVE TERMINAL AGGREGATION

CROSS REFERENCE TO THE RELATED APPLICATIONS

This application is based upon and claims priority to Chinese Patent Application No. 202310944946.2, filed on Jul. 28, 2023, the entire contents of which are incorporated herein by reference.

TECHNICAL FIELD

The invention relates to the field of communication technology, in particular to a cooperative transmission method based on adaptive terminal aggregation.

BACKGROUND

With the continuous progress of communication technology and the development of business, higher requirements are put forward for the delay and reliability of business. Especially in scenarios such as the Industry Internet of Things (IIoT), personal consumption, medical care, and smart cities. Some services have Ultra-Reliability Low Latency Communication (URLLC) requirements, such as smart cities, intelligent transportation, smart grids, intelligent transportation systems, and intelligent health services. The third generation partnership project (3GPP) has formulated various functions of the fifth generation (5G) NR system, which requires that the reliability should reach 99.9999% and the delay should be less than 1 ms. However, for many application scenarios, it is difficult to meet the requirements of URLLC and the energy performance is high. At present, the processing power of the device is limited and the energy performance overhead is also constrained in many IIoT and personal consumption application scenarios. At the same time, to further reduce the cost of IoT sensors, 5G defines Reduced Capability (RedCap). Compared with conventional NR devices, low-performance NR devices have the advantages of lower cost and complexity, smaller shape factor, and longer battery life. However, the simplification of the radio frequency (RF) and baseband capabilities of the device limits the coverage and rate of such devices.

Therefore, the mobile communication system has gradually evolved into a heterogeneous system, there are various types of mobile terminals (MTs) or user equipments (UEs) with different processing capabilities in the system, and there are various services with different communication indicators. With the change in business form and demand, reliability, delay, energy performance, and other indicators are also different, which brings greater challenges to communication systems and communication terminals, and related technologies are gradually optimized.

The existing technology is not designed for the comprehensive optimization of energy performance and delay. In the wireless communication scenario, the communication link changes in real time, the available energy of each terminal or device changes, and the communication indicators of different services are different. How to jointly optimize energy performance and delay in a heterogeneous system has become a major problem.

SUMMARY

The purpose of this invention is to provide a cooperative transmission method based on adaptive terminal aggregation, by dynamically adjusting the values of the first regulatory factor and the second regulatory factor, the adaptive terminal aggregation form with the low energy-delay product (EDP) or matching service reliability requirements is selected according to the channel state between the base station, the mobile terminal and the cooperative node, and then the comprehensive optimization of transmission reliability, transmission delay and energy performance is realized.

In order to achieve the above purpose, the invention provides a cooperative transmission method based on adaptive terminal aggregation, including a base station, several mobile terminals, and several cooperative nodes, which is characterized by the following steps:

S1, judging an aggregation form by a judgment node according to the quality of a first link and the quality of a second link;

S2, based on a control signaling received from a base station, transmitting business data to the base station by a mobile terminal at a first-time point and within a specific resource;

S3, if the aggregation form is a transmission from a cooperative node, monitoring the business data transmitted via the mobile terminal at the first-time point in S2 by one or several cooperative nodes and decoding the business data;

if the aggregation form is an aggregation transmission from the mobile terminal, repeating S2 and transmitting the business data continuously to the base station by the mobile terminal until the base station correctly decodes the business data, and not monitoring the business data of the mobile terminal by one or several cooperative nodes;

if the aggregation form is an aggregation transmission from the mobile terminal and cooperative node, monitoring the business data transmitted via the mobile terminal at the first-time point in S2 by one or several cooperative nodes and decoding the business data, and transmitting the business data to the base station by both the mobile terminal and the cooperative node.

Preferably, the judgment node in S1 is a base station of a cell, specifically:

judging the aggregation form for each mobile terminal and one or several cooperative nodes associated with the mobile terminal by a base station based on a cooperative transmission mode of adaptive terminal aggregation, and transmitting information in the aggregation form to the mobile terminal and the cooperative node.

Preferably, the judgment node in S1 is a cooperative node of the cell, specifically:

judging the aggregation form for one or several surrounding mobile terminals by the cooperative node based on the cooperative transmission mode of adaptive terminal aggregation, feeding back the information in the aggregation form to the base station, and transmitting the information in the aggregation form to the mobile terminal by the base station.

Preferably, the judgment node in S1 is a cooperative node of the cell, specifically:

judging the aggregation form for one or several surrounding mobile terminals by the cooperative node based on the cooperative transmission mode of adaptive terminal aggregation, feeding back the information in the aggregation form to the base station, and transmitting the information in the aggregation form to the mobile terminal by the cooperative node.

Preferably, the approach to judge the aggregation form is as follows:

comparing a quality of the first link and a quality of the second link, when the quality of the first link is greater than the quality of the second link and a difference exceeds a first regulatory factor, that is, the quality of the first link>the quality of the second link+the first regulatory factor, it is judged that the aggregation form is the mobile terminal transmission;

when the quality of the second link is greater than the quality of the first link and the difference exceeds a second regulatory factor, that is, the quality of the second link>the quality of the first link+the second regulatory factor, it is judged that the aggregation form is the cooperative node transmission;

when the difference between the quality of the first link and the quality of the second link is neither greater than the first regulatory factor nor greater than the second regulatory factor, if a power of the mobile terminal is not limited, it is judged that the aggregation form is the aggregation transmission of the mobile terminal and the cooperative node;

when the difference between the quality of the first link and the quality of the second link is neither greater than the first regulatory factor nor greater than the second regulatory factor, if the power of the mobile terminal is limited, it is judged that the aggregation form is the cooperative node transmission;

the quality of the first link represents a channel state between the mobile terminal and the base station, which is recorded as $\gamma_{UB}$; the quality of the second link represents the channel state between the cooperative node and the base station, which is recorded as $\gamma_{RB}$, the channel state represents a signal-to-interference-plus-noise ratio; units of $\gamma_{UB}$ and $U_{RB}$ are dB; the first regulatory factor is recorded as $\alpha$, and the second regulatory factor is recorded as $\beta$, the units of $\alpha$ and $\beta$ are dB;

then, an expression for judging the aggregation form is as follows:

$$\begin{cases} \gamma_{UB} > \alpha + \gamma_{RB}, \text{ mobile terminal transmission} \\ \gamma_{RB} > \beta + \gamma_{UB}, \text{ cooperative node transmission} \\ \gamma_{UB} - \gamma_{RB} < \alpha, \text{ and } \gamma_{RB} - \gamma_{UB} < \beta, \\ \quad \text{power of the mobile terminal is not limited,} \\ \quad \text{aggregation transmission of the mobile terminal} \\ \quad \quad \text{and the cooperative node} \\ \gamma_{UB} - \gamma_{RB} < \alpha, \text{ and } \gamma_{RB} - \gamma_{UB} < \beta, \\ \quad \text{power of the mobile terminal is limited,} \\ \quad \quad \text{cooperative node transmission} \end{cases}$$

a value of the first regulatory factor and a value of the second regulatory factor are related to a demodulation threshold of the business data and the quality of a third link, the quality of the third link represents the channel state between the mobile terminal and the cooperative node, which is recorded as $\gamma_{UR}$; $\gamma_{UR}$ represents the signal-to-interference-plus-noise ratio, and the unit of $\gamma_{UR}$ is dB.

Preferably, in S3, if one or several cooperative nodes decode correctly, transmitting a correct decoding report to the base station by the cooperative node at a second-time point, at the third time point, encoding a decoded business data by the cooperative node and transmitting it to the base station through predefined rules;

if one or several cooperative nodes do not decode correctly, monitoring the business data transmitted via the mobile terminal continuously by the cooperative node until the business data is decoded, transmitting the correct decoding report to the base station by the cooperative node, at the third time point, decoding the obtained business data by the cooperative node, and then encoding and transmitting it to the base station through predefined rules;

after the cooperative node continuously monitors the business data transmitted by the mobile terminal at least $N_1$ times, it decodes correctly, the value of $N_1$ depends on the demodulation threshold of the business data and the quality of the third link, the expression of $N_1$ is as follows:

$$N_1 = \left\lceil 10^{\frac{\gamma_{th} - \gamma_{UR}}{10}} \right\rceil$$

where $\gamma_{th}$ represents the demodulation threshold of the business data, and the unit of $\gamma_{th}$ is dB.

Preferably, in S3, if one or several cooperative nodes decode correctly, transmitting the correct decoding report to the base station by the cooperative node at the second-time point, and transmitting the control signaling to the cooperative node by the base station, at the third time point, encoding the decoded business data to the base station by the cooperative node according to the received control signaling;

if one or several cooperative nodes do not decode correctly, monitoring the business data transmitted via the mobile terminal continuously by the cooperative node until the business data is decoded, transmitting the correct decoding report to the base station by the cooperative node, and transmitting the control signaling to the cooperative node by the base station, at the third time point, transmitting the decoded business data by the cooperative node, and then encoding and transmitting it to the base station according to the received control signaling;

after the cooperative node continuously monitors the business data transmitted by the mobile terminal at least $N_1$ times, it decodes correctly, the value of $N_1$ depends on the demodulation threshold of the business data and the quality of the third link, the expression of $N_1$ is as follows:

$$N_1 = \left\lceil 10^{\frac{\gamma_{th} - \gamma_{UR}}{10}} \right\rceil$$

where $\gamma_{th}$ represents the demodulation threshold of the business data, and the unit of $\gamma_{th}$ is dB.

Preferably, if the aggregation form is the mobile terminal transmission in S3, transmitting the business data to the base station continuously at least $N_2$ times by the mobile terminal, the value of $N_2$ depends on the demodulation threshold of the business data and the quality of the first link, the expression of $N_2$ is as follows:

$$N_2 = \left\lceil 10^{\frac{\gamma_{th} - \gamma_{UB}}{10}} \right\rceil,$$

if the aggregation form is the aggregation transmission of the mobile terminal and the cooperative node, aggregating and transmitting the business data at least $N_3$ times by the mobile terminal and the cooperative node, the value of $N_3$ depends on the demodulation threshold of the business data, the quality of the first link, the quality of the second link and the quality of the third link, the expression of $N_3$ is as follows:

$$N_3 = \left\lceil \frac{10^{\frac{\gamma_{th}}{10}} - 10^{\frac{\gamma_{UB}}{10}} \cdot N_1}{10^{\frac{\gamma_{UB}}{10}} + 10^{\frac{\gamma_{RB}}{10}}} \right\rceil.$$

Preferably, at the third time point, transmitting the decoded business data to the base station at least $N_4$ times by the cooperative node, $N_4$ depends on the demodulation threshold of the business data, the quality of the first link, the quality of the second link, and the quality of the third link, the expression of $N_4$ is as follows:

$$N_4 = \left\lceil 10^{\frac{\gamma_{th}-\gamma_{RB}}{10}} - 10^{\frac{\gamma_{UB}-\gamma_{RB}}{10}} \cdot N_1 \right\rceil.$$

Preferably, judging the specific aggregation form according to an energy-delay product in S1, and the expression of the energy-delay product is as follows:

$$\varsigma = E \times \tau$$

where $\zeta$ represents the energy-delay product, E represents an energy performance of the mobile terminal and the cooperative node when the business data is successfully decoded by the base station, and $\tau$ represents the time consumption when the business data is successfully decoded by the base station;

according to the energy-delay product, the specific aggregation form is determined as follows:

when the quality of the first link is greater than the quality of the second link, the aggregation form is the mobile terminal transmission or the aggregation transmission of the mobile terminal and the cooperative node, judging the specific aggregation form according to the energy-delay product of the mobile terminal transmission and the energy-delay product of the aggregation transmission of the mobile terminal and the cooperative node, specifically:

if the energy-delay product transmitted by the mobile terminal is greater than the energy-delay product of the aggregation transmission of the mobile terminal and the cooperative node, that is, $$N_2^2 > (N_1 + 2N_3)(N_1 + N_3),$$

the specific aggregation form is the aggregation transmission of the mobile terminal and the cooperative node; if the energy-delay product of the mobile terminal transmission is less than or equal to the energy-delay product of the aggregation transmission of the mobile terminal and the cooperative node, that is, $$N_2^2 \le (N_1 + 2N_3)(N_1 + N_3),$$

6 the specific aggregation form is the mobile terminal transmission;

when the quality of the first link is less than the quality of the second link, the aggregation form is the cooperative node transmission or the aggregation transmission of the mobile terminal and the cooperative node, judging the specific aggregation form according to the energy-delay product of the cooperative node transmission and the energy-delay product of the aggregation transmission of the mobile terminal and the cooperative node;

if the energy-delay product of the cooperative node transmission is greater than the energy-delay product of the aggregation transmission of the mobile terminal and the cooperative node, that is, $(N_1+N_4)^2>(N_1+2N_3)(N_1+N_3)$, the specific aggregation form is the aggregation transmission of the mobile terminal and the cooperative node; if the energy-delay product of the cooperative node transmission is less than or equal to the energy-delay product of the aggregation transmission of the mobile terminal and the cooperative node, that is, $(N_1+N_4)^2 \le (N_1+2N_3)(N_1+N_3)$, the specific aggregation form is the cooperative node transmission.

Therefore, the invention adopts the above-mentioned cooperative transmission method based on adaptive terminal aggregation, and the beneficial effects are as follows:

(1) By dynamically selecting the mobile terminal to transmit the business data, the invention can make the cooperative node assist the mobile terminal to transmit business data, or the mobile terminal and the cooperative node to aggregate and transmit business data.

(2) By dynamically adjusting the value of the first regulatory factor and the second regulatory factor, the invention can make the mobile terminal with low quality of the first link reduce the energy performance of the mobile terminal as much as possible when there are cooperative nodes to assist the transmission of business data.

(3) By dynamically adjusting the value of the first regulatory factor and the second regulatory factor, even if the invention can make the cooperative node receives the business data of the mobile terminal for the cooperative node with low quality of the second link, it does not assist in transmitting the business data, and reduces the energy performance of the cooperative node as much as possible.

(4) By judging the overall performance of the system by the energy-delay product and dynamically adjusting the first regulatory factor and the second regulatory factor, the invention can select the adaptive terminal aggregation form with lower EDP according to the channel state among the base station, the mobile terminal, and the cooperative node, thereby improving the overall performance of the system and improving the stability.

(5) By dynamically adjusting the value of the first regulatory factor and the second regulatory factor, the invention can adjust the energy performance and delay of the system dynamically in a range.

The following is a further detailed description of the technical solution of the invention through drawings and embodiments.

DETAILED DESCRIPTION OF THE EMBODIMENTS

Figure 1:
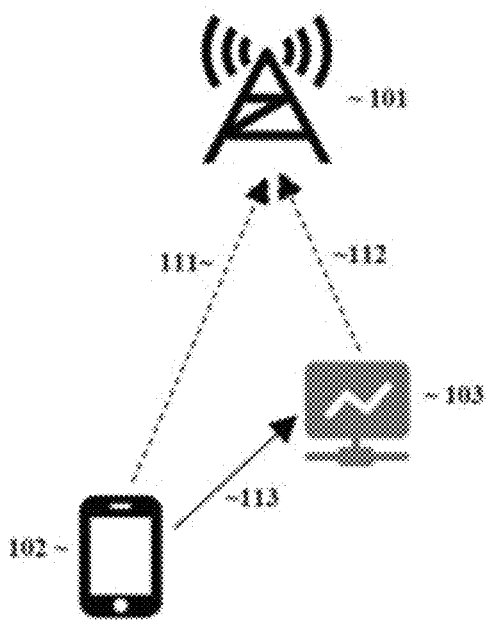
FIG. 1 is a schematic diagram of the embodiments of the cooperative transmission method based on adaptive terminal aggregation.

The following is a further explanation of the technical solution of the invention through drawings and embodiments.

Unless otherwise defined, the technical terms or scientific terms used in the invention should be understood by people with general skills in the field to which the invention belongs.

The invention is suitable for wireless communication scenarios, especially the Internet of Things, the system involves a base station, several mobile terminals and several cooperative nodes, and it aims to solve the high reliability and low latency requirements of wireless communication scenarios, according to the wireless communication environment, business requirements, and other factors, the joint optimization of delay and energy performance is realized.

The technical method adopted in the invention is a cooperative transmission method based on adaptive terminal aggregation, the device providing wireless data service for the mobile terminal is called a judgment node, which can be a base station of the cell or a wifi access device, the wireless communication technology in this invention is based on the Narrow Band-Internet of Things (NB-IoT), or the Internet of Things communication technology or an extended version for enhanced Machine Type Communication (eMTC), or the 5G standard, or an evolved version of the 5G standard. The mobile terminal, cooperative node, and base station in the invention are realized based on the above wireless communication technology.

As shown in the figures, a cooperative transmission method based on adaptive terminal aggregation includes a base station, several mobile terminals, and several cooperative nodes, the steps are as follows:

S1, the judgment node judges the aggregation form according to the quality of the first link and the quality of the second link, and transmits the business data;

when the judgment node is the base station of the cell, the base station based on a cooperative transmission mode of adaptive terminal aggregation judges the aggregation form for each mobile terminal and one or more cooperative nodes associated with the mobile terminal, and transmits the aggregation form information to the mobile terminal and the cooperative node;

when the judgment node is the base station of the cell, the cooperative node based on the cooperative transmission mode of adaptive terminal aggregation judges the aggregation form for one or several surrounding mobile terminals, and feeds back the information in the aggregation form to the base station, and the base station transmits the information in the aggregation form to the mobile terminal;

when the judgment node is the base station of the cell, the cooperative node based on the cooperative transmission mode of adaptive terminal aggregation judges the aggregation form for one or several surrounding mobile terminals, and feeds back the information in the aggregation form to the base station, and the cooperative node transmits the information in the aggregation form to the mobile terminal.

The approach to judge the aggregation form in this invention is as follows:

comparing the quality of the first link and the quality of the second link, when the quality of the first link is greater than the quality of the second link and a difference exceeds the first regulatory factor, that is, the quality of the first link>the quality of the second link+the first regulatory factor, it is judged that the aggregation form is the mobile terminal transmission;

when the quality of the second link is greater than the quality of the first link and the difference exceeds the second regulatory factor, that is, the quality of the second link>the quality of the first link+the second regulatory factor, it is judged that the aggregation form is the cooperative node transmission;

when the difference between the quality of the first link and the quality of the second link is neither greater than the first regulatory factor nor greater than the second regulatory factor, if the power of the mobile terminal is not limited, it is judged that the aggregation form is the aggregation transmission of the mobile terminal and the cooperative node;

when the difference between the quality of the first link and the quality of the second link is neither greater than the first regulatory factor nor greater than the second regulatory factor, if the power of the mobile terminal is limited, it is judged that the aggregation form is the cooperative node transmission;

the quality of the second link represents the channel state between the mobile terminal and the base station, which is recorded as $\gamma_{UB}$; the quality of the second link represents the channel state between the cooperative node and the base station, which is recorded as $\gamma_{RB}$, the channel state represents the signal-to-interference-plus-noise ratio; units of $\gamma_{UB}$ and $\gamma_{RB}$ are dB; the first regulatory factor is recorded as $\alpha$, and the second regulatory factor is recorded as $\beta$, the units of $\alpha$ and $\beta$ are dB;

then an expression for judging the aggregation form is as follows:

$$\begin{cases} \gamma_{UB} > \alpha + \gamma_{RB}, \text{ mobile terminal transmission} \\ \gamma_{RB} > \beta + \gamma_{UB}, \text{ cooperative node transmission} \\ \gamma_{UB} - \gamma_{RB} < \alpha, \text{ and } \gamma_{RB} - \gamma_{UB} < \beta, \\ \quad \text{power of the mobile terminal is not limited,} \\ \text{aggregation transmission of the mobile terminal} \\ \quad \text{and the cooperative node} \\ \gamma_{UB} - \gamma_{RB} < \alpha, \text{ and } \gamma_{RB} - \gamma_{UB} < \beta, \\ \quad \text{power of the mobile terminal is limited,} \\ \quad \text{cooperative node transmission} \end{cases}$$

In this invention, the first regulatory factor and the second regulatory factor are introduced to comprehensively optimize the delay and energy performance, and dynamically adjust according to the delay of the actual service and the energy performance of each device of the system. When the value of the first regulatory factor or the value of the second regulatory factor is larger, it means that in many cases the aggregation form is the aggregation transmission of the mobile terminal and the cooperative node, that is, the business data in the transmission process is through multiple nodes or multiple transmission paths; when the value of the first regulatory factor or the value of the second regulatory factor is smaller, it means that in many cases the aggregation form is the mobile terminal transmission or the cooperative node transmission.

In this invention, the first regulatory factor and the second regulatory factor affect the overall performance of the system, the value of the first regulatory factor and the value of the second regulatory factor are related to the demodulation threshold of the business data and the quality of the third link. The quality of the third link represents the channel state between a mobile terminal and a cooperative node, recorded as $\gamma_{UR}$, $\gamma_{UR}$ represents the signal-to-interference-plus-noise ratio, and the unit of $\gamma_{UR}$ is dB.

S2, based on a control signaling received from the base station, the mobile terminal transmits business data to the base station at the first-time point and within a specific resource;

S3, if the aggregation form is the cooperative node transmission, one or several cooperative nodes monitor the business data transmitted via the mobile terminal at the first-time point in S2 and decode the business data; the steps are as follows:

if one or several cooperative nodes decode correctly, the cooperative node transmits the correct decoding report to the base station at the second-time point, and the base station transmits the control signaling to the cooperative node, at the third time point, the cooperative node transmits the decoded business data to the base station at least $N_4$ times, $N_4$ depends on the demodulation threshold of the business data, the quality of the first link, the quality of the second link and the quality of the third link, the expression of $N_4$ is as follows:

$$N_4 = \left\lceil 10^{\frac{\gamma_{th} - \gamma_{RB}}{10}} - 10^{\frac{\gamma_{UB} - \gamma_{RB}}{10}} \cdot N_1 \right\rceil$$

the business data transmitted in S2 and the business data transmitted in S3 are allowed to be combined and decoded at the base station.

If one or several cooperative nodes do not decode correctly, the cooperative node continuously monitors the business data of the mobile terminal until it decodes correctly, and repeats the above steps: the cooperative node transmits the correct decoding report to the base station, and the base station transmits the control signaling to the cooperative node, at the third time point, the cooperative node encodes the decoded business data and transmits it to the base station through the received control signaling.

The invention also provides a solution:

S3, if the aggregation form is the cooperative node transmission, one or several cooperative nodes monitor the business data transmitted via the mobile terminal at the first-time point in S2 and decode the business data; the steps are as follows:

if one or several cooperative nodes decode correctly, the cooperative node transmits the correct decoding report to the base station at the second-time point, at the third time point, the cooperative node encodes the decoded business data and transmits it to the base station through predefined rules, the cooperative node transmits at least $N_4$ business data, $N_4$ depends on the demodulation threshold of the business data, the quality of the first link, the quality of the second link and the quality of the third link, the expression of $N_4$ is as follows:

$$N_4 = \left\lceil 10^{\frac{\gamma_{th} - \gamma_{RB}}{10}} - 10^{\frac{\gamma_{UB} - \gamma_{RB}}{10}} \cdot N_1 \right\rceil$$

the business data transmitted in S2 and the business data transmitted in S3 are allowed to be combined and decoded at the base station.

If one or several cooperative nodes do not decode correctly, the cooperative node continuously monitors the business data of the mobile terminal until it decodes correctly, and repeats the above steps: the cooperative node transmits the correct decoding report to the base station, and at the third time point, the cooperative node decodes the obtained business data and encodes it to the base station through predefined rules.

In this invention, a cooperative node needs to continuously monitor the business data transmitted by the mobile terminal at least $N_1$ times before it can correctly decode, the value of $N_1$ depends on the demodulation threshold of the business data and the quality of the third link, the expression of $N_1$ is as follows:

$$N_1 = \left\lceil 10^{\frac{\gamma_{th} - \gamma_{UR}}{10}} \right\rceil$$

where $\gamma_{th}$ represents the demodulation threshold of the business data, and the unit of $\gamma_{th}$ is dB.

If the aggregation form is the mobile terminal transmission, the mobile terminal repeats S2 and continues to transmit business data to the base station until the base station correctly decodes the business data, and one or several cooperative nodes do not monitor the business data of the mobile terminal.

In this invention, the mobile terminal repeats S2, and the mobile terminal continuously transmits the business data at least $N_2$ times to the base station, the value of $N_2$ depends on the demodulation threshold of the business data and the quality of the first link, the expression of $N_2$ is as follows:

$$N_2 = \left\lceil 10^{\frac{\gamma_{th} - \gamma_{UB}}{10}} \right\rceil.$$

If the aggregation form is the aggregation transmission of the mobile terminal and the cooperative node, one or several cooperative nodes monitor the business data transmitted by the mobile terminal at the first-time point in S2 and decode it, and both the mobile terminal and the cooperative node transmit the business data to the base station.

In the invention, the mobile terminal and the cooperative node aggregate and transmit the business data at least $N_3$ times, the value of $N_3$ depends on the demodulation threshold of the business data, the quality of the first link, the quality of the second link, and the quality of the third link, the expression of $N_3$ is as follows:

$$N_3 = \left\lceil \frac{10^{\frac{\gamma_{th}}{10}} - 10^{\frac{\gamma_{UB}}{10}} \cdot N_1}{10^{\frac{\gamma_{UB}}{10}} + 10^{\frac{\gamma_{RB}}{10}}} \right\rceil.$$

The invention judges the specific aggregation form according to the energy-delay product (EDP), so as to judge the overall performance of the system, the expression of the energy-delay product is:

$$\varsigma = E \times \tau$$

where $\zeta$ represents the energy-delay product, E represents the energy performance of the mobile terminal and the cooperative node when the business data is successfully decoded by the base station, and $\tau$ represents the time consumption when the business data is successfully decoded by the base station.

In the invention, it is assumed that the quality of the first link is statistically averaged and inversely proportional to the square of the distance between the mobile terminal and the base station.

In this invention, it is assumed that the quality of the second link is statistically averaged and inversely proportional to the square of the distance between the cooperative node and the base station.

In this invention, it is assumed that the quality of the third link is statistically averaged and inversely proportional to the square of the distance between the mobile terminal and the cooperative node.

According to the energy-delay product, the specific aggregation form is determined as follows:

In this invention, when the quality of the first link is greater than the quality of the second link, the aggregation form is the mobile terminal transmission or the aggregation transmission of the mobile terminal and the cooperative node, the specific aggregation form is judged according to the energy-delay product of the mobile terminal transmission and the energy-delay product of the aggregation transmission of the mobile terminal and the cooperative node:

if the energy-delay product of the mobile terminal transmission is greater than the energy-delay product of the aggregation transmission of the mobile terminal and the cooperative node, that is, $N_2^2 > (N_1 + 2N_3)(N_1 + N_3)$, the specific aggregation form is the aggregation transmission of the mobile terminal and the cooperative node;

if the energy-delay product of the mobile terminal transmission is less than or equal to the energy-delay product transmitted by the mobile terminal and the cooperative node, that is, $N_2^2 \leq (N_1 + 2N_3)(N_1 + N_3)$, the specific aggregation form is the mobile terminal transmission;

in this invention, when the quality of the first link is less than the quality of the second link, the aggregation form is the aggregation transmission of the mobile terminal and the cooperative node, and the specific aggregation form is judged according to the energy-delay product of the cooperative node transmission and the energy-delay product of the aggregation transmission of the mobile terminal and the cooperative node:

if the energy-delay product of the cooperative node transmission is greater than the energy-delay product of the mobile terminal and the cooperative node aggregation, that is, $(N_1 + N_4)^2 > (N_1 + 2N_3)(N_1 + N_3)$, the specific aggregation form is the aggregation transmission of the mobile terminal and the cooperative node;

if the energy-delay product of the cooperative node transmission is less than or equal to the energy-delay product of the aggregation transmission of the mobile terminal and the cooperative node, that is, $(N_1 + N_4)^2 \leq (N) + 2N_3)(N_1 + N_3)$, the specific aggregation form is the cooperative node transmission.

The following will explain the cooperative transmission method and system based on adaptive terminal aggregation provided by the invention in combination with the attached figures.

Embodiment 1

As shown in FIG. 1, a wireless communication network consists of base station 101, mobile terminal 102, and cooperative node 103.

In this specific embodiment of the invention, when the base station 101 receives the broadcast business data of mobile terminal 102, but cooperative node 103 does not receive the broadcast business data of mobile terminal 102, the aggregation form is judged to be mobile terminal 102 transmission, that is, mobile terminal 102 transmits the business data to base station 101 through uplink 111.

When the quality of the first link is larger than the quality of the second link, and the difference is the first regulatory factor $\alpha$, that is, the quality of the first link>the quality of the second link+the first regulatory factor, the aggregation form is judged to be mobile terminal 102 transmission, that is, mobile terminal 102 transmits business data to base station 101 through uplink 111.

When the quality of the second link is greater than the quality of the first link, the difference is the second regulatory factor $\beta$, that is, the quality of the second link>the quality of the first link+the second regulatory factor, the aggregation form is judged to be cooperative node 103 transmission, that is, mobile terminal 102 transmits the business data to cooperative node 103 through link 113, after cooperative node 103 correctly decodes and receives the control signaling issued by base station 101, cooperative node 103 will decode the business data of mobile terminal 102 and transmit it to base station 101 through the received control signaling coding and uplink 112.

When the quality of the second link and the quality of the first link do not conform to the quality of the first link>the quality of the second link+the first regulatory factor and the quality of the second link>the quality of the first link+the second regulatory factor, it is judged that the aggregation form is the aggregated transmission of mobile terminal 102 and cooperative node 103, that is, mobile terminal 102 broadcasts business data to base station 101 through uplink 111 and broadcasts the business data to cooperative node 103 through link 113, cooperative node 103 correctly decodes and receives the control signaling issued by base station 101, cooperative node 103 will decode the business data of mobile terminal 102, and transmit it to base station 101 through the received control signaling coding and uplink 112, at this time, cooperative node 103 and mobile terminal 102 both transmit the business data to base station 101.

Embodiment 2

Figure 2:
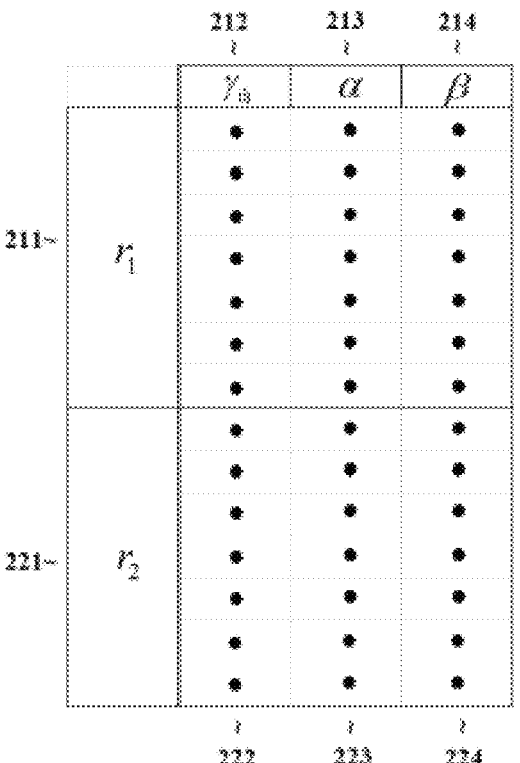
FIG. 2 is a value of the optimal first regulatory factor and the optimal second regulatory factor in the embodiments of the invention.

FIG. 2 shows the optimal first regulatory factor $\alpha$ and the optimal second regulatory factor value $\beta$ under the cooperative transmission method based on adaptive terminal aggregation.

In a specific embodiment of the invention, under the conditions of distance 211 between the cooperative node and the base station and the demodulation threshold 212 of the business data, the optimal first regulatory factor 213 and the optimal second regulatory factor 214 can be calculated by the energy-delay product of the above different aggregation forms.

In a specific embodiment of the invention, under the conditions of distance 221 between the cooperative node and the base station and the demodulation threshold 222 of the business data, the optimal first regulatory factor 223 and the optimal second regulatory factor 224 can be calculated by the energy-delay product of the above different aggregation forms.

As shown in Table 1, the values of the optimal first regulatory factor $\alpha$ and the optimal second regulatory factor $\beta$ under the demodulation threshold of some business data under the parameter configuration of the invention are shown.

TABLE 1

| The values of some optimal first regulatory factors and some optimal second regulatory factors: | | |
| --- | --- | --- |
| $\gamma_{th}$ (dB) | $\alpha$ (dB) | $\beta$ (dB) |
| 11 | 2.9553 | 1.8684 |
| 12 | 3.9555 | 0.0381 |
| 13 | 4.4283 | 4.5690 |
| 14 | 4.1943 | 2.6465 |
| 15 | 5.1738 | 3.0921 |

Figure 3:
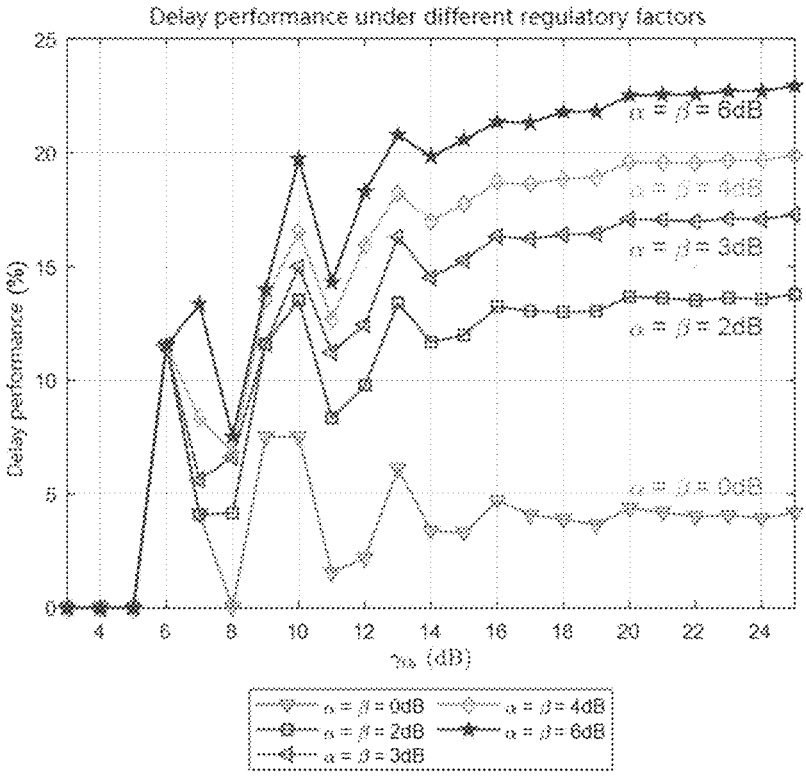
FIG. 3 is a schematic diagram of the delay performance under different regulatory factors based on the performance of the traditional relay in the embodiments of the invention.

As shown in FIG. 3, the delay performance diagrams of different first regulatory factor $\alpha$ and second regulatory factor $\beta$ in the invention are shown, the performance is based on the traditional relay, when the first regulatory factor $\alpha$ and the second regulatory factor $\beta$ are larger, the delay performance is greater, and it is closer to the delay performance of the two-node transmission, when the first regulatory factor $\alpha$ and the second regulatory factor $\beta$ are smaller, the delay performance is smaller, and it is closer to the delay performance of the single-node transmission.

Figure 4:
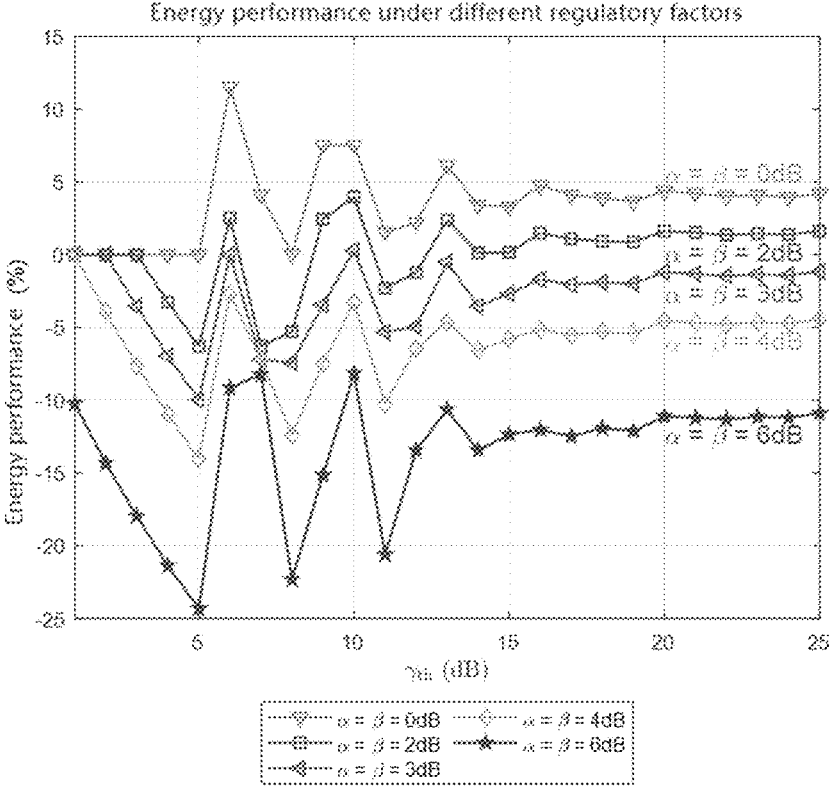
FIG. 4 is a schematic diagram of the energy performance gain under different regulatory factors based on the performance of the traditional relay in the embodiments of the invention.

As shown in FIG. 4, the energy performance gain diagrams of different first regulatory factors $\alpha$ and second regulatory factor $\beta$ in the invention are shown. The performance is based on the traditional relay, when the first regulatory factor $\alpha$ and the second regulatory factor $\beta$ are larger, the energy performance gain is smaller, and it is closer to the delay performance of the two-node transmission, when the first regulatory factor $\alpha$ and the second regulatory factor $\beta$ are smaller, the delay performance is greater, and it is closer to the delay performance of the single-node transmission.

Figure 5:
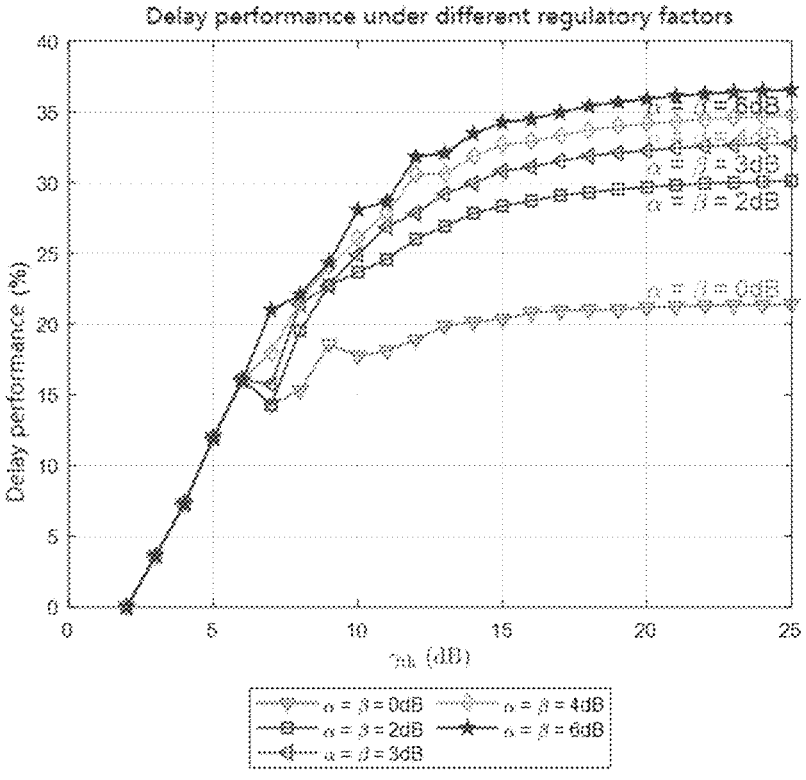
FIG. 5 is a schematic diagram of the delay performance under different regulatory factors based on the performance of the traditional cellular in the embodiments of the invention.

As shown in FIG. 5, the delay performance diagrams of different first regulatory factors $\alpha$ and second regulatory factor $\beta$ in the invention are shown, the performance is based on the traditional cellular, when the first regulatory factor $\alpha$ and the second regulatory factor $\beta$ are larger, the delay performance is greater, and it is closer to the delay performance of the two-node transmission, when the first regulatory factor $\alpha$ and the second regulatory factor $\beta$ are smaller, the delay performance is smaller, and it is closer to the delay performance of the single-node transmission.

Figure 6:
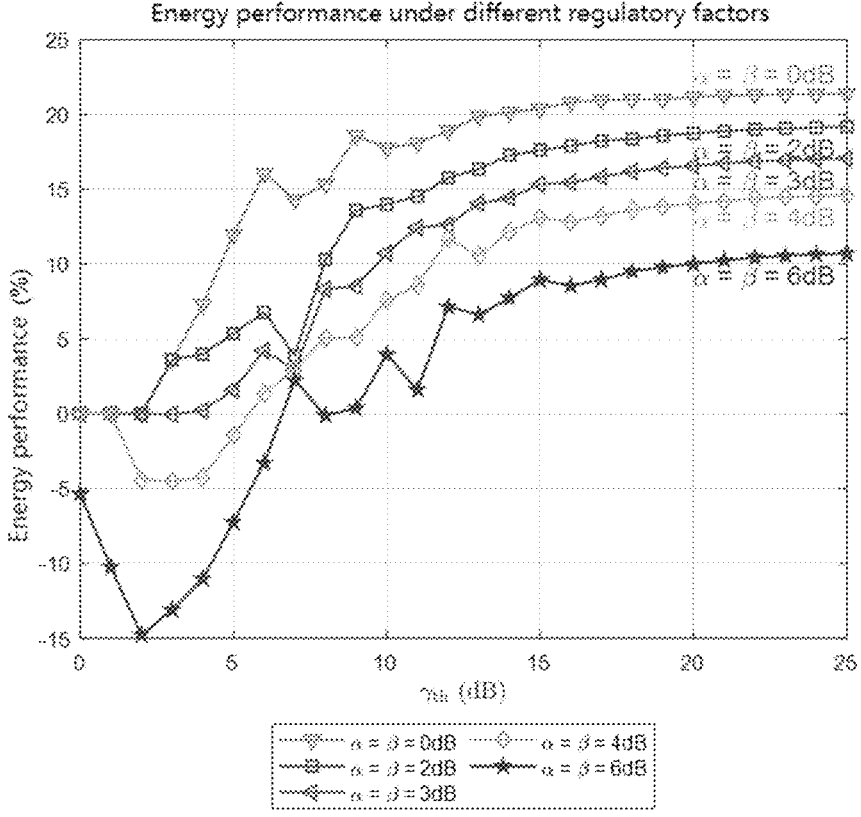
FIG. 6 is a schematic diagram of the energy performance gain under different regulatory factors based on the performance of the traditional cellular in the embodiments of the invention.

As shown in FIG. 6, the energy performance gain diagrams of different first regulatory factors $\alpha$ and second regulatory factors $\beta$ in the invention are shown. The performance is based on the traditional cellular, when the first regulatory factor $\alpha$ and the second regulatory factor $\beta$ are larger, the energy performance gain is smaller, and it is closer to the delay performance of two-node transmission, when the first regulatory factor $\alpha$ and the second regulatory factor $\beta$ are smaller, the delay performance is greater, and it is closer to the delay performance of single-node transmission.

Figure 7:
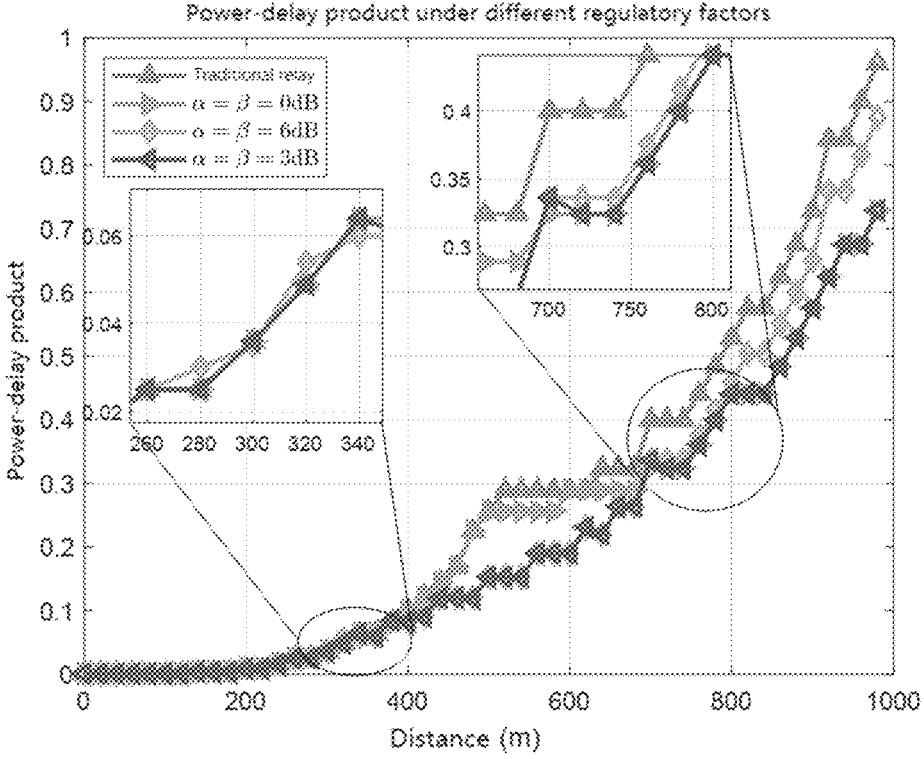
FIG. 7 is a comparison diagram of the energy-delay product under different regulatory factors and the energy-delay product of the traditional relay in the embodiments of the invention.

As shown in FIG. 7, the comparison of the energy-delay product under different aggregation forms in the invention with the energy-delay product of the traditional relay is shown. By dynamically adjusting the first regulatory factor $\alpha$ and the second regulatory factor $\beta$, the delay and energy performance can be comprehensively optimized.

Figure 8:
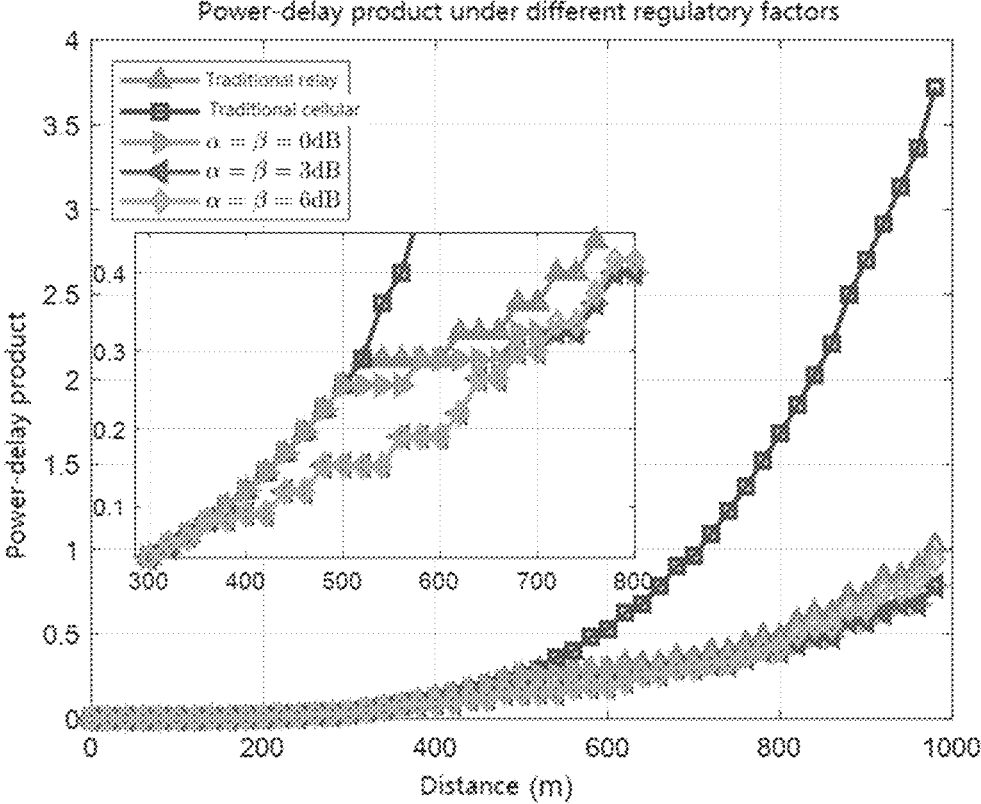
FIG. 8 is a comparison diagram of the energy-delay product under different regulatory factors and the energy-delay product of the traditional cellular in the embodiments of the invention.

FIG. 8 shows the comparison between the energy-delay product of different aggregation forms in the invention and the energy-delay product of traditional cellular. The first regulatory factor $\alpha$ and the second regulatory factor $\beta$ are dynamically adjusted, which can comprehensively optimize the delay and energy performance.

Therefore, the invention adopts the above-mentioned cooperative transmission method based on adaptive terminal aggregation, which can dynamically select the mobile terminal to transmit the business data, the cooperative node to assist the mobile terminal to transmit the business data, or the mobile terminal and the cooperative node to aggregate and transmit the business data. By dynamically adjusting the value of the first regulatory factor and the second regulatory factor, the adaptive terminal aggregation form with lower EDP is selected according to the channel state between the base station, the mobile terminal, and the cooperative node, thereby improving the overall performance of the system and improving the stability.

Finally, it should be explained that the above embodiments are only used to explain the technical solution of the invention rather than restrict it. Although the invention is described in detail with reference to the better embodiments, the ordinary technical personnel in this field should understand that they can still modify or replace the technical solution of the invention, and these modifications or equivalent substitutions cannot make the modified technical solution out of the spirit and scope of the technical solution of the invention.

What is claimed is:

1. A cooperative transmission method based on adaptive terminal aggregation, comprising arranging a base station, several mobile terminals, and several cooperative nodes, and comprising following steps:

S1, judging an aggregation form by a judgment node according to a quality of a first link and a quality of a second link;

S2, based on a control signaling received from the base station, transmitting business data to the base station by a mobile terminal at a first-time point and within a specific resource;

S3, when the aggregation form is a cooperative node transmission, monitoring the business data transmitted via the mobile terminal at the first-time point in S2 by one or several cooperative nodes and decoding the business data;

when the aggregation form is a mobile terminal transmission, repeating S2 and transmitting the business data continuously to the base station by the mobile terminal until the base station correctly decodes the business data, and not monitoring the business data of the mobile terminal by one or several cooperative nodes; and when the aggregation form is an aggregation transmission of the mobile terminal and cooperative node, monitoring the business data transmitted via the mobile terminal at the first-time point in S2 by one or several cooperative nodes and decoding the business data, and transmitting the business data to the base station by both the mobile terminal and the cooperative node;

wherein an approach to judge the aggregation form is as follows:

comparing the quality of the first link and the quality of the second link, when the quality of the first link is greater than the quality of the second link and a difference exceeds a first regulatory factor, that is, the quality of the first link>the quality of the second link+the first regulatory factor, it is judged that the aggregation form is the mobile terminal transmission;

when the quality of the second link is greater than the quality of the first link and the difference exceeds a second regulatory factor, that is, the quality of the second link>the quality of the first link+the second regulatory factor, it is judged that the aggregation form is the cooperative node transmission;

when the difference between the quality of the first link and the quality of the second link is neither greater than the first regulatory factor nor greater than the second regulatory factor, if a power of the mobile terminal is not limited, it is judged that the aggregation form is the aggregation transmission of the mobile terminal and the cooperative node;

when the difference between the quality of the first link and the quality of the second link is neither greater than the first regulatory factor nor greater than the second regulatory factor, if the power of the mobile terminal is limited, it is judged that the aggregation form is the cooperative node transmission;

the quality of the first link represents a channel state between the mobile terminal and the base station and is recorded as $\gamma_{UB}$; the quality of the second link represents the channel state between the cooperative node and the base station and is recorded as $\gamma_{RB}$, the channel state represents a signal-to-interference-plus-noise ratio; units of $\gamma_{UB}$ and $\gamma_{RB}$ are dB; the first regulatory factor is recorded as $\alpha$, and the second regulatory factor is recorded as $\beta$, units of $\alpha$ and $\beta$ are dB;

then an expression for judging the aggregation form is as follows:

16

$$\begin{cases} \gamma_{UB} > \alpha + \gamma_{RB}, \text{ mobile terminal transmission} \\ \gamma_{RB} > \beta + \gamma_{UB}, \text{ cooperative node transmission} \\ \gamma_{UB} - \gamma_{RB} < \alpha, \text{ and } \gamma_{RB} - \gamma_{UB} < \beta, \text{ power of the mobile} \\ \qquad \text{terminal is not limited,} \\ \gamma_{UB} - \gamma_{RB} < \alpha, \text{ and } \gamma_{RB} - \gamma_{UB} < \beta, \\ \text{power of the mobile terminal is limited, cooperative} \\ \qquad \text{node transmission} \end{cases}$$

a value of the first regulatory factor and a value of the second regulatory factor are related to a demodulation threshold of the business data and a quality of a third link, the quality of the third link represents the channel state between the mobile terminal and the cooperative node and is recorded as $\gamma_{UR}$; $\gamma_{UR}$ represents the signal-to-interference-plus-noise ratio, and a unit of $\gamma_{UR}$ is dB.

2. The cooperative transmission method based on adaptive terminal aggregation according to claim 1, wherein the judgment node in S1 is a base station of a cell, and is configured to implement an operation of:

judging the aggregation form for each mobile terminal and one or several cooperative nodes associated with the mobile terminal by a base station based on a cooperative transmission mode of adaptive terminal aggregation, and transmitting information in the aggregation form to the mobile terminal and the cooperative node by the base station.

3. The cooperative transmission method based on adaptive terminal aggregation according to claim 2, wherein the aggregation form is judged according to an energy-delay product in S1, and an expression of the energy-delay product is as follows:

$$\varsigma = E \times \tau$$

wherein $\varsigma$ represents the energy-delay product, E represents an energy performance of the mobile terminal and the cooperative node when the business data is successfully decoded by the base station, and $\tau$ represents a time consumption when the business data is successfully decoded by the base station;

according to the energy-delay product, a specific aggregation form is determined as follows:

when the quality of the first link is greater than the quality of the second link, the aggregation form is the mobile terminal transmission or the aggregation transmission of the mobile terminal and the cooperative node, judging the specific aggregation form according to the energy-delay product of the mobile terminal transmission and the energy-delay product of the aggregation transmission of the mobile terminal and the cooperative node, wherein if the energy-delay product transmitted by the mobile terminal is greater than the energy-delay product of the aggregation transmission of the mobile terminal and the cooperative node, that is, $$N_2^2 > (N_1 + 2N_3)(N_1 + N_3),$$

the specific aggregation form is the aggregation transmission of the mobile terminal and the cooperative node; if the energy-delay product of the mobile terminal transmission is less than or equal to the energy-delay product of the aggregation transmission of the mobile terminal and the cooperative node, that is, $$N_2^2 \le (N_1 + 2N_3)(N_1 + N_3),$$

the specific aggregation form is the mobile terminal transmission;

when the quality of the first link is less than the quality of the second link, the aggregation form is the cooperative node transmission or the aggregation transmission of the mobile terminal and the cooperative node, judging the specific aggregation form according to the energy-delay product of the cooperative node transmission and the energy-delay product of the aggregation transmission of the mobile terminal and the cooperative node, wherein if the energy-delay product of the cooperative node transmission is greater than the energy-delay product of the aggregation transmission of the mobile terminal and the cooperative node, that is, $(N_1+N_4)^2 > (N_1+2N_3) (N_1+N_3)$, the specific aggregation form is the aggregation transmission of the mobile terminal and the cooperative node; if the energy-delay product of the cooperative node transmission is less than or equal to the energy-delay product of the aggregation transmission of the mobile terminal and the cooperative node, that is, $(N_1+N_4)^2 \le (N_1+2N_3) (N_1+N_3)$, the specific aggregation form is the cooperative node transmission.

4. The cooperative transmission method based on adaptive terminal aggregation according to claim 1, wherein the judgment node in S1 is a cooperative node of a cell, and is configured to implement an operation of:

judging the aggregation form for one or several surrounding mobile terminals by the cooperative node based on a cooperative transmission mode of adaptive terminal aggregation, feeding back information in the aggregation form to the base station, and transmitting the information in the aggregation form to the mobile terminal by the cooperative node.

5. The cooperative transmission method based on adaptive terminal aggregation according to claim 4, wherein the aggregation form is judged according to an energy-delay product in S1, and an expression of the energy-delay product is as follows:

$$\varsigma = E \times \tau$$

wherein ç represents the energy-delay product, E represents an energy performance of the mobile terminal and the cooperative node when the business data is successfully decoded by the base station, and τ represents a time consumption when the business data is successfully decoded by the base station;

according to the energy-delay product, a specific aggregation form is determined as follows:

when the quality of the first link is greater than the quality of the second link, the aggregation form is the mobile terminal transmission or the aggregation transmission of the mobile terminal and the cooperative node, judging the specific aggregation form according to the energy-delay product of the mobile terminal transmission and the energy-delay product of the aggregation transmission of the mobile terminal and the cooperative node, wherein if the energy-delay product transmitted by the mobile terminal is greater than the energy-delay product of the aggregation transmission of the mobile terminal and the cooperative node, that is, $$N_2^2 > (N_1 + 2N_3)(N_1 + N_3),$$

the specific aggregation form is the aggregation transmission of the mobile terminal and the cooperative node; if the energy-delay product of the mobile terminal transmission is less than or equal to the energy-delay product of the aggregation transmission of the mobile terminal and the cooperative node, that is, $$N_2^2 \le (N_1 + 2N_3)(N_1 + N_3),$$

the specific aggregation form is the mobile terminal transmission;

when the quality of the first link is less than the quality of the second link, the aggregation form is the cooperative node transmission or the aggregation transmission of the mobile terminal and the cooperative node, judging the specific aggregation form according to the energy-delay product of the cooperative node transmission and the energy-delay product of the aggregation transmission of the mobile terminal and the cooperative node, wherein if the energy-delay product of the cooperative node transmission is greater than the energy-delay product of the aggregation transmission of the mobile terminal and the cooperative node, that is, $(N_1+N_4)^2 > (N_1+2N_3) (N_1+N_3)$, the specific aggregation form is the aggregation transmission of the mobile terminal and the cooperative node; if the energy-delay product of the cooperative node transmission is less than or equal to the energy-delay product of the aggregation transmission of the mobile terminal and the cooperative node, that is, $(N_1+N_4)^2 \le (N_1+2N_3) (N_1+N_3)$, the specific aggregation form is the cooperative node transmission.

6. The cooperative transmission method based on adaptive terminal aggregation according to claim 1, wherein the judgment node in S1 is a cooperative node of a cell, and is configured to implement an operation of:

judging the aggregation form for one or several surrounding mobile terminals by the cooperative node based on a cooperative transmission mode of adaptive terminal aggregation, feeding back information in the aggregation form to the base station, and transmitting the information in the aggregation form to the mobile terminal by the cooperative node.

7. The cooperative transmission method based on adaptive terminal aggregation according to claim 6, wherein the aggregation form is judged according to an energy-delay product in S1, and an expression of the energy-delay product is as follows:

$$\varsigma = E \times \tau$$

wherein ç represents the energy-delay product, E represents an energy performance of the mobile terminal and the cooperative node when the business data is successfully decoded by the base station, and τ represents a time consumption when the business data is successfully decoded by the base station;

according to the energy-delay product, a specific aggregation form is determined as follows:

when the quality of the first link is greater than the quality of the second link, the aggregation form is the mobile terminal transmission or the aggregation transmission of the mobile terminal and the cooperative node, judging the specific aggregation form according to the energy-delay product of the mobile terminal transmission and the energy-delay product of the aggregation transmission of the mobile terminal and the cooperative node, wherein if the energy-delay product transmitted by the mobile terminal is greater than the energy-delay product of the aggregation transmission of the mobile terminal and the cooperative node, that is, $$N_2^2 > (N_1 + 2N_3)(N_1 + N_3),$$

the specific aggregation form is the aggregation transmission of the mobile terminal and the cooperative node; if the energy-delay product of the mobile terminal transmission is less than or equal to the energy-delay product of the aggregation transmission of the mobile terminal and the cooperative node, that is, $$N_2^2 \le (N_1 + 2N_3)(N_1 + N_3),$$

the specific aggregation form is the mobile terminal transmission;

when the quality of the first link is less than the quality of the second link, the aggregation form is the cooperative node transmission or the aggregation transmission of the mobile terminal and the cooperative node, judging the specific aggregation form according to the energy-delay product of the cooperative node transmission and the energy-delay product of the aggregation transmission of the mobile terminal and the cooperative node, wherein if the energy-delay product of the cooperative node transmission is greater than the energy-delay product of the aggregation transmission of the mobile terminal and the cooperative node, that is, $(N_1+N_4)^2 > (N_1+2N_3) (N_1+N_3)$, the specific aggregation form is the aggregation transmission of the mobile terminal and the cooperative node; if the energy-delay product of the cooperative node transmission is less than or equal to the energy-delay product of the aggregation transmission of the mobile terminal and the cooperative node, that is, $(N_1+N_4)^2 \le (N_1+2N_3) (N_1+N_3)$, the specific aggregation form is the cooperative node transmission.

8. The cooperative transmission method based on adaptive terminal aggregation according to claim 1, wherein in S3, if one or several cooperative nodes decode correctly, transmitting a correct decoding report to the base station by the cooperative node at a second-time point, at a third time point, encoding decoded business data by the cooperative node and transmitting it to the base station through predefined rules;

if one or several cooperative nodes do not decode correctly, monitoring the business data transmitted via the mobile terminal continuously by the cooperative node until the business data is decoded, transmitting the correct decoding report to the base station by the cooperative node, at the third time point, decoding the obtained business data by the cooperative node, and then encoding and transmitting it to the base station through predefined rules;

after the cooperative node continuously monitors the business data transmitted by the mobile terminal at least $N_1$ times, it decodes correctly, a value of $N_1$ depends on a demodulation threshold of the business data and a quality of a third link, an expression of $N_1$ is as follows:

$$N_1 = \left\lceil 10^{\frac{\gamma_{th}-\gamma_{UR}}{10}} \right\rceil$$

wherein $\gamma_{th}$ represents the demodulation threshold of the business data, and a unit of $\gamma_{th}$ is dB.

9. The cooperative transmission method based on adaptive terminal aggregation according to claim 8, wherein at the third time point, transmitting the decoded business data to the base station at least $N_4$ times by the cooperative node, $N_4$ depends on the demodulation threshold of the business data, the quality of the first link, the quality of the second link and the quality of the third link, an expression of $N_4$ is as follows:

$$N_4 = \left\lceil 10^{\frac{\gamma_{th}-\gamma_{RB}}{10}} - 10^{\frac{\gamma_{UB}-\gamma_{RB}}{10}} \cdot N_1 \right\rceil.$$

10. The cooperative transmission method based on adaptive terminal aggregation according to claim 1, wherein in S3, if one or several cooperative nodes decode correctly transmitting a correct decoding report to the base station by the cooperative node at the second-time point, and transmitting the control signaling to the cooperative node by the base station, at the third time point, encoding the decoded business data to the base station by the cooperative node according to the received control signaling;

if one or several cooperative nodes do not decode correctly, monitoring the business data transmitted via the mobile terminal continuously by the cooperative node until the business data is decoded, transmitting the correct decoding report to the base station by the cooperative node, and transmitting the control signaling to the cooperative node by the base station, at the third time point, transmitting the decoded business data by the cooperative node, and then encoding and transmitting it to the base station according to the received control signaling;

after the cooperative node continuously monitors the business data transmitted by the mobile terminal at least $N_1$ times, it decodes correctly, a value of $N_1$ depends on a demodulation threshold of the business data and a quality of a third link, an expression of $N_1$ is as follows:

$$N_1 = \left\lceil 10^{\frac{\gamma_{th}-\gamma_{UR}}{10}} \right\rceil$$

21 wherein $\gamma_{th}$ represents the demodulation threshold of the business data, and a unit of $\gamma_{th}$ is dB.

11. The cooperative transmission method based on adaptive terminal aggregation according to claim 10, wherein at the third time point, transmitting the decoded business data to the base station at least $N_4$ times by the cooperative node, $N_4$ depends on the demodulation threshold of the business data, the quality of the first link, the quality of the second link and the quality of the third link, an expression of $N_4$ is as follows:

$$N_4 = \left\lceil 10^{\frac{\gamma_{th}-\gamma_{RB}}{10}} - 10^{\frac{\gamma_{UB}-\gamma_{RB}}{10}} \cdot N_1 \right\rceil.$$

12. The cooperative transmission method based on adaptive terminal aggregation according to claim 1, wherein if the aggregation form is the mobile terminal transmission in S3, transmitting the business data to the base station continuously at least $N_2$ times by the mobile terminal, a value of $N_2$ depends on a demodulation threshold of the business data and the quality of the first link, an expression of $N_2$ is as follows:

22

$$N_2 = \left\lceil 10^{\frac{\gamma_{th}-\gamma_{UB}}{10}} \right\rceil,$$

if the aggregation form is the aggregation transmission of the mobile terminal and the cooperative node, aggregating and transmitting the business data at least $N_3$ times by the mobile terminal and the cooperative node, a value of $N_3$ depends on a demodulation threshold of the business data, the quality of the first link, the quality of the second link and a quality of a third link, an expression of $N_3$ is as follows:

$$N_3 = \left\lceil \frac{10^{\frac{\gamma_{th}}{10}} - 10^{\frac{\gamma_{UB}}{10}} \cdot N_1}{10^{\frac{\gamma_{UB}}{10}} + 10^{\frac{\gamma_{RB}}{10}}} \right\rceil.$$

\* \* \* \* \*